(12) United States Patent
Maeda (10) Patent No.: US 10,513,579 B2
(45) Date of Patent: Dec. 24, 2019

(54) EPOXY RESIN COMPOSITION AND STRUCTURE

(71) Applicant: SUMITOMO BAKELITE CO., LTD., Tokyo (JP)

(72) Inventor: Shigeyuki Maeda, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 16/346,784

(22) PCT Filed: Sep. 12, 2017

(86) PCT No.: PCT/JP2017/032806
§ 371 (c)(1),
(2) Date: May 1, 2019

(87) PCT Pub. No.: WO2018/083885
PCT Pub. Date: Nov. 5, 2018

(65) Prior Publication Data
US 2019/0256647 A1    Aug. 22, 2019

(30) Foreign Application Priority Data

Nov. 2, 2016 (JP) ................................. 2016-214890

(51) Int. Cl.
| C08K 5/3445 | (2006.01) |
| C08G 59/62 | (2006.01) |
| C08G 59/24 | (2006.01) |
| C08G 59/68 | (2006.01) |
| C08K 3/36 | (2006.01) |
| C09K 3/10 | (2006.01) |
| C08K 7/18 | (2006.01) |

(52) U.S. Cl.
CPC ......... *C08G 59/621* (2013.01); *C08G 59/245* (2013.01); *C08G 59/686* (2013.01); *C08K 3/36* (2013.01); *C08K 5/3445* (2013.01); *C08K 7/18* (2013.01); *C09K 3/10* (2013.01); *C08K 2201/005* (2013.01); *C09K 2200/0247* (2013.01); *C09K 2200/0647* (2013.01)

(58) Field of Classification Search
CPC ........................... C08K 5/3445; C08G 59/621
See application file for complete search history.

(56) References Cited

U.S. PATENT DOCUMENTS

| 9,659,883 | B2 | 5/2017 | Morita et al. |
| 9,868,751 | B2 | 1/2018 | Kim et al. |
| 2016/0115184 | A1 | 4/2016 | Kim et al. |
| 2016/0211228 | A1 | 7/2016 | Morita et al. |

FOREIGN PATENT DOCUMENTS

| CN | 102167886 A | 8/2011 |
| JP | 8-164532 A | 6/1996 |
| JP | 2001-226463 A | 8/2001 |
| JP | 2008-81684 A | 4/2008 |
| JP | 2008-81685 A | 4/2008 |
| JP | 2009-235211 A | 10/2009 |
| JP | 2015-86359 A | 5/2015 |
| JP | 2015-137344 A | 7/2015 |
| JP | 2016-84342 A | 5/2016 |

OTHER PUBLICATIONS

International Search Report, issued in PCT/JP2017/032806, PCT/ISA/210, dated Nov. 21, 2017.
Office Action issued in Japanese Patent Application No. 2018-500809 dated Mar. 6, 2018.
Written Opinion of the International Searching Authority, issued in PCT/JP2017/032806, PCT/ISA/237, dated Nov. 21, 2017.
Office Action dated Aug. 28, 2019, in Chinese Patent Application No. 201780067682.X.

*Primary Examiner* — Peter D. Mulcahy
(74) *Attorney, Agent, or Firm* — Birch, Stewart, Kolasch & Birch, LLP (57) ABSTRACT

An epoxy resin composition of the present invention includes an epoxy resin, a curing agent, an inorganic filler, and a curing accelerator, in which a maximum exothermic peak temperature in a DSC curve of the epoxy resin composition obtained in a case of elevating a temperature from 30° C. to 200° C. under a condition of a temperature elevating rate of 10° C./min using a differential scanning calorimeter is equal to or higher than 80° C. and equal to or lower than 145° C.

18 Claims, 1 Drawing Sheet

EPOXY RESIN COMPOSITION AND STRUCTURE

TECHNICAL FIELD

The present invention relates to an epoxy resin composition and a structure.

BACKGROUND ART

Various investigations have hitherto been conducted for the purpose of accelerating curing of an epoxy resin. Examples of such a technique include a technique described in Patent Document 1. According to the same document, it is described that by using a phosphonium-based compound, it is possible to accelerate curing of an epoxy resin, the fluidity during molding is excellent, high curing strength is exhibited, and curing can be performed even for a short curing time.

RELATED DOCUMENT

Patent Document

[Patent Document 1] Japanese Laid-open Patent Publication No. 2016-084342

SUMMARY OF THE INVENTION

Technical Problem

However, as a result of the investigations conducted by the present inventors, it was found that an epoxy resin composition using the phosphonium-based compound described in Patent Document 1 has room for improvement in terms of low-temperature curability.

Solution to Problem

According to the present invention, there is provided an epoxy resin composition including:
an epoxy resin,
a curing agent,
an inorganic filler, and
a curing accelerator,
in which a maximum exothermic peak temperature in a DSC curve of the epoxy resin composition obtained in a case of elevating a temperature from 30° C. to 200° C. under a condition of a temperature elevating rate of 10° C./min using a differential scanning calorimeter is equal to or higher than 80° C. and equal to or lower than 145° C.

Furthermore, according to the present invention, a structure including a cured product of the epoxy resin composition is provided.

Advantageous Effects of Invention

According to the present invention, it is possible to provide an epoxy resin composition having excellent low-temperature curability and a structure using the same.

BRIEF DESCRIPTION OF THE DRAWINGS

The above-mentioned objects and other objects, features, and advantages will become more apparent with reference to the following description of suitable embodiments and the accompanying drawings.

DESCRIPTION OF EMBODIMENTS

Hereinafter, embodiments will be described with reference to the drawings as appropriate. Incidentally, in all the drawings, the same components are denoted by the same symbols and descriptions thereof will not be repeated.

[Epoxy Resin Composition]

The epoxy resin composition of the present embodiment can include an epoxy resin, a curing agent, an inorganic filler, and a curing accelerator. In the epoxy resin composition of the present embodiment, a maximum exothermic peak temperature in a DSC curve of the epoxy resin composition obtained in a case of elevating a temperature from 30° C. to 200° C. under a condition of a temperature elevating rate of 10° C./min using a differential scanning calorimeter can be set to a temperature equal to or higher than 80 C and equal to or lower than 145° C.

The present inventors have further conducted investigations, taking low-temperature curability into consideration for an epoxy resin composition, and thus, they have found that the low-temperature curability can be stably evaluated by adopting a maximum exothermic peak temperature in a DSC curve as an index. Based on these findings, the present inventors have further conducted extensive studies, and have thus found that the low-temperature curability of the epoxy resin composition can be improved by setting the maximum exothermic peak temperature to be equal to or less than a predetermined value, thereby completing the present invention.

According to the present embodiment, it is possible to realize an epoxy resin composition having good curability even in a case where the epoxy resin composition is cured under a condition of a low temperature equal to or lower than 120° C.

The composition of the epoxy resin composition of the present embodiment will be described.

[Epoxy Resin]

The epoxy resin in the present embodiment is a general monomer, oligomer, or polymer having two or more epoxy groups in one molecule thereof, and the molecular weight and molecular structure thereof are not particularly limited.

Examples of the epoxy resin include bifunctional or crystalline epoxy resins such as a biphenyl type epoxy resin, a bisphenol A type epoxy resin, a bisphenol F type epoxy resin, a stilbene type epoxy resin, and a hydroquinone type epoxy resin; novolak type epoxy resins such as a cresol novolak type epoxy resin, a phenol novolak type epoxy resin, and a naphthol novolak type epoxy resin; phenolaralkyl type epoxy resins such as a phenylene skeleton-containing phenolaralkyl type epoxy resin, a biphenylene skeleton-containing phenolaralkyl type epoxy resin, and a naphthol aralkyl type epoxy resin containing a phenylene skeleton; trifunctional epoxy resins such as a triphenolmethane type epoxy resin and an alkyl-modified triphenolmethane type epoxy resin; modified phenol type epoxy resins such as a dicyclopentadiene-modified phenol type epoxy resin and a terpene-modified phenol type epoxy resin; and heterocycle-containing epoxy resins such as a triazine nucleus-containing epoxy resin. These may be used alone or in combination of two or more kinds thereof.

The lower limit value of the content of the epoxy resin in the epoxy resin composition of the present embodiment is, for example, preferably equal to or more than 8% by mass, more preferably equal to or more than 10% by mass, and particularly preferably equal to or more than 12% by mass, with respect to the total solid content of the epoxy resin composition. By setting the content of the epoxy resin to be equal to or more than the lower limit value, it is possible to improve the fluidity of the epoxy resin composition and thus promote further improvement of moldability.

On the other hand, the upper limit value of the content of the epoxy resin is, for example, preferably equal to or less than 30% by mass, and more preferably equal to or less than 20% by mass, with respect to the total solid content of the epoxy resin composition. By setting the content of the epoxy resin to be equal to or less than the upper limit value, it is possible to improve moisture resistance reliability, reflow resistance, or temperature resistance cyclability for a semiconductor device including a cured product formed using the epoxy resin composition and other structures.

In the present embodiment, the total solid content of the epoxy resin composition refers to a non-volatile fraction in the epoxy resin composition, and also refers to a remainder excluding volatile components such as water and a solvent. Further, in the present embodiment, the content with respect to the entire epoxy resin composition refers to a content with respect to the total solid content of the resin composition excluding a solvent in a case where the resin composition includes the solvent.

[Curing Agent]

The curing agent in the present embodiment is not particularly limited as long as it is generally used in an epoxy resin composition, but examples thereof include a phenol resin-based curing agent, an amine-based curing agent, an acid anhydride-based curing agent, and a mercaptan-based curing agent. Among those, the phenol resin-based curing agent is preferable in terms of a balance among flame resistance, moisture resistance, electric characteristics, curability, storage stability, and the like.

<Phenol Resin-Based Curing Agent>

The phenol resin-based curing agent is not particularly limited as long as it is generally used in an epoxy resin compositions, but examples thereof include novolak resins obtained by the condensation or co-condensation of phenols such as phenol, cresol, resorcin, catechol, bisphenol A, bisphenol F, phenylphenol, aminophenol, α-naphthol, β-naphthol, and dihydroxynaphthalene with formaldehydes or ketones in the presence of an acidic catalyst, the novolak resins encompassing a phenol novolak resin and a cresol novolak resin; phenolaralkyl resins such as a phenolaralkyl resin having a phenylene skeleton, synthesized from the phenols and dimethoxyparaxylene or bis (methoxymethyl) biphenyl, and a phenolaralkyl resin having a biphenylene skeleton; and phenol resins having a trisphenylmethane skeleton. These may be used alone or in combination of two or more kinds thereof.

<Amine-Based Curing Agent>

Examples of the amine-based curing agent include polyamine compounds including dicyandiamide (DICY), an organic acid dihydralazide, or the like, in addition to aliphatic polyamines such as diethylenetriamine (DETA), triethylenetetramine (TETA), and metaxylylene diamine (MXDA), and aromatic polyamines such as diaminodiphenylmethane (DDM), m-phenylenediamine (MPDA), and diaminodiphenylsulfone (DDS). These may be used alone or in combination of two or more kinds thereof.

<Acid Anhydride-Based Curing Agent>

Examples of the acid anhydride-based curing agent include alicyclic acid anhydrides such as hexahydrophthalic anhydride (HHPA), methyltetrahydrophthalic anhydride (MTHPA), and maleic anhydride, and aromatic acid anhydrides such as trimellitic anhydride (TMA), pyromellitic anhydride (PMDA), benzophenonetetracarboxylic dianhydride (BTDA), and phthalic anhydride. These may be used alone or in combination of two or more kinds thereof.

<Mercaptan-Based Curing Agent>

Examples of the mercaptan-based curing agent include trimethylolpropane tris(3-mercaptobutyrate) and trimethylol ethane tris(3-mercaptobutyrate). These may be used alone or in combination of two or more kinds thereof.

<Other Curing Agents>

Other curing agents include isocyanate compounds such as an isocyanate prepolymer and a blocked isocyanate, and organic acids such as a carboxylic acid-containing polyester resin. These may be used alone or in combination of two or more kinds thereof.

In addition, two or more kinds of the curing agents having different bases among the above-mentioned curing agents may be used in combination.

In a case where the curing agent is a phenol resin-based curing agent, the equivalent ratio of the epoxy resin and the curing agent, that is, the ratio of the number of moles of the epoxy group in the epoxy resin/the number of moles of the phenolic hydroxyl group in the phenol resin-based curing agent is not particularly limited, but is, for example, preferably in a range equal to or more than 0.5 and equal to or less than 2, more preferably in a range equal to or more than 0.6 and equal to or less than 1.8, and most preferably in a range equal to or more than 0.8 and equal to or less than 1.5 in order to obtain an epoxy resin composition having excellent moldability and reliability.

[Inorganic Filler]

The epoxy resin composition of the present embodiment can contain an inorganic filler.

Examples of the inorganic filler include fused silica such as fused crushed silica and fused spherical silica, silica such as crystalline silica, alumina, aluminum hydroxide, silicon nitride, and aluminum nitride. These may be used alone or in combination of two or more kinds thereof. Among those, the fused crushed silica, the fused spherical silica, or the silica such as crystalline silica can be preferably used, and the fused spherical silica can be more preferably used.

The lower limit value of the average particle diameter (D50) of the inorganic filler may be, for example, equal to or more than 0.01 µm, equal to or more than 1 µm, or equal to or more than 5 µm. With this value, it possible to improve the fluidity of the epoxy resin composition, and thus improve the moldability more effectively. Further, the upper limit value of the average particle diameter (D50) of the inorganic filler is, for example, equal to or less than 50 µm, and preferably equal to or less than 40 µm. With this value, it is possible to reliably suppress occurrence of non-filling or the like. In addition, the inorganic filler of the present embodiment can include at least an inorganic filler having an average particle diameter (D50) equal to or more than 1 µm and equal to or less than 50 µm. With this value, it is possible to achieve more excellent fluidity.

In the present embodiment, the average particle diameter (D50) of the inorganic filler is determined as follows: a particle size distribution of the particles is measured on a volume basis using a commercially available laser diffraction type particle size distribution measuring apparatus (for example, SALD-7000 manufactured by Shimadzu Corporation), and a median diameter (D50) thus obtained can be defined as an average particle diameter.

Furthermore, as the inorganic filler, for example, two or more kinds of fillers having different average particle diameters (D50) may be used in combination. With this combination, it is possible to more effectively enhance the fillability of the inorganic filler with respect to the total solid content of the epoxy resin composition. In addition, in the present embodiment, an example in which a filler having an average particle diameter equal to or more than 0.01 μm and equal to or less than 1 μm and a filler having an average particle diameter of more than 1 μm and equal to or less than 50 μm are included may be used from the viewpoint of improving the fillability of the epoxy resin composition.

Moreover, as an example of the inorganic filler of the present embodiment, for example, a first filler having an average particle diameter equal to or more than 0.01 μm and equal to or less than 1 μm, a second filler having an average particle diameter of more than 1 μm to 15 μm or less, and a third filler having an average particle diameter of more than 15 μm and equal to or less than 50 μm can be included from the viewpoint of further improving the fillability of the epoxy resin composition.

The lower limit value of the content of the inorganic filler is, for example, preferably equal to or more than 70% by mass, more preferably equal to or more than 73% by mass, and particularly preferably equal to or more than 75% by mass, with respect to the total solid content of the epoxy resin composition. With this value, it is possible to improve the low hygroscopicity and the low thermal expansion properties, and thus more effectively improve the temperature resistance cyclability and the reflow resistance of a semiconductor device and other structures. On the other hand, the upper limit value of the content of the inorganic filler is, for example, preferably equal to or less than 95% by mass, more preferably equal to or less than 93% by mass, and particularly preferably equal to or less than 90% by mass, with respect to the total solid content of the epoxy resin composition. With this value, it is possible to more effectively improve the fluidity or fillability during the molding of the epoxy resin composition.

[Curing Accelerator]

The epoxy resin composition of the present embodiment can further contain, for example, a curing accelerator. The curing accelerator may be anyone that accelerates a cross-linking reaction between the epoxy resin and the curing agent, and one used for common epoxy resin compositions can be used.

In the present embodiment, the curing accelerator can include an imidazole-based curing accelerator.

Examples of the imidazole-based curing accelerator include imidazole, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl(1')]-ethyl-s-triazine, 2,4-diamino-6-[2'-undecylimidazolyl(1')]-ethyl-s-triazine, 2,4-diamino-6-[2'-ethyl-4-methylimidazolyl(1')]-ethyl-s-triazine, an isocyanuric acid adduct of 2,4-diamino-6-[2'-methylimidazolyl(1')]-ethyl-s-triazine, an isocyanuric acid adduct of 2-phenylimidazole, an isocyanuric acid adduct of 2-methylimidazole, 2-phenyl-4,5-dihydroxydimethylimidazole, and 2-phenyl-4-methyl-5-hydroxymethylimidazole. These may be used alone or in combination of two or more kinds thereof.

Among those, one or more selected from the group consisting of 2-phenylimidazole, 2-methylimidazole, 2-phenyl-4-methylimidazole, and 2-phenyl-4-methyl-5-hydroxymethylimidazole are preferably included from the viewpoint of improving the low-temperature curability and the fillability. 2-Phenylimidazole and/or 2-methylimidazole is more preferably used.

In addition, from the viewpoint of a balance between the low-temperature curability and the fillability, the number of functional groups of the imidazole-based curing accelerator is, for example, preferably equal to or less than 3, and more preferably equal to or less than 1.

In the present embodiment, the lower limit value of the content of the curing accelerator is, for example, preferably equal to or more than 0.20% by mass, more preferably equal to or more than 0.40% by mass, and particularly preferably equal to or more than 0.70% by mass, with respect to the total solid content of the epoxy resin composition. By setting the content of the curing accelerator to be equal to or more than the lower limit value, it is possible to more effectively improve the curability during molding. On the other hand, the upper limit value of the content of the curing accelerator is, for example, preferably equal to or less than 3.0% by mass, and more preferably equal to or less than 2.0% by mass, with respect to the total solid content of the epoxy resin composition. By setting the content of the curing accelerator to be equal to or less than the upper limit value, it is possible to accelerate improvement of the fluidity during molding.

In addition, the lower limit value of the content of the curing accelerator is, for example, preferably equal to or more than 3.5% by mass, more preferably equal to or more than 4.0% by mass, and particularly preferably equal to or more than 5.0% by mass, with respect to the total solid content of the epoxy resin. By setting the content of the curing accelerator to be equal to or more than the lower limit value, it is possible to effectively improve the low-temperature curability during molding. On the other hand, the upper limit value of the content of the curing accelerator may be, for example, equal to or less than 12.0% by mass, equal to or less than 11.0% by mass, or equal to or less than 10.0% by mass, with respect to the total solid content of the epoxy resin. By setting the content of the curing accelerator to be equal to or less than the upper limit value, it is possible to accelerate improvement of the fluidity during molding.

[Coupling Agent]

The epoxy resin composition of the present embodiment can include, for example, a coupling agent. Examples of the coupling agent include known coupling agents, such as various silane-based compounds such as epoxysilane, mercaptosilane, aminosilane, alkylsilane, ureidosilane, vinylsilane, and methacrylsilane, titanium-based compounds, aluminum chelates, and aluminum/zirconium-based compounds. Examples thereof include silane-based coupling agents such as vinyltrichlorosilane, vinyltrimethoxysilane, vinyltriethoxysilane, vinyltris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-glycidoxypropyltriethoxysilane, γ-glycidoxypropylmethyldimethoxysilane, γ-methacryloxypropylmethyldiethoxysilane, γ-methacryloxypropyltriethoxysilane, vinyltriacetoxysilane, γ-mercaptopropyltrimethoxysilane, γ-aminopropyltriethoxysilane, γ-anilinopropyltrimethoxysilane, γ-anilinopropylmethyldimethoxysilane, γ-[bis(β-hydroxyethyl)]aminopropyltriethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, phenylaminopropyltrimethoxysilane, γ-(β-aminoethyl) aminopropyldimethoxymethylsilane, N-(trimethoxysilylpropyl)ethylenediamine, N-(dimethoxymethylsilylisopropyl)ethylenediamine, methyltrimethoxysilane, dimethyldimethoxysilane, methyltriethoxysilane, N-β-(N-vinylbenzylaminoethyl)-γ-aminopropyltrimethoxysilane, γ-chloropropyltrimethoxysilane, hexamethyldisilane, vinyltrimethoxysilane, y-mercaptopropylmethyldimethoxysilane, 3-isocyanatorpropyltriethoxysilane, 3-acryloxypropyltrimethoxysilane, and a hydrolysate of 3-triethoxysilyl-N-(1,3-dimethyl-butylidene)propylamine; and titanate-based coupling agents such as isopropyltriisostearoyl titanate, isopropyltris(dioctyl pyrophosphate) titanate, isopropyltri(N-aminoethyl-aminoethyl) titanate, tetraoctyl bis(ditridecyl phosphite) titanate, tetra(2,2-diallyloxymethyl-1-butyl)bis(ditridecyl)phosphite titanate, bis(dioctyl pyrophosphate) oxyacetate titanate, bis(dioctyl pyrophosphate) ethylene titanate, isopropyltrioctanoyl titanate, isopropyldimethacrylisostearoyl titanate, isopropyltridodecylbenzenesulfonyl titanate, isopropylisostearoyldiacryl titanate, isopropyltri(dioctylphosphate) titanate, isopropyltricumylphenyl titanate, and tetraisopropylbis(dioctyl phosphite) titanate. These may be used singly or in combination of two or more kinds thereof. Among those, the silane-based compounds of epoxysilane, mercaptosilane, aminosilane, alkylsilane, ureidosilane, or vinylsilane are more preferable. In addition, from the viewpoint of more effectively improving the fillability or the moldability, it is particularly preferable to use a secondary aminosilane typified by phenylaminopropyltrimethoxysilane.

The lower limit value of the content of the coupling agent is preferably equal to or more than 0.1% by mass, and more preferably equal to or more than 0.15% by mass, with respect to the total solid content of the epoxy resin composition. By setting the content of the coupling agent to be equal to or more than the lower limit value, it is possible to improve the fluidity of the epoxy resin composition. On the other hand, the upper limit value of the content of the coupling agent is preferably equal to or less than 1% by mass, and more preferably equal to or less than 0.5% by mass, with respect to the total solid content of the epoxy resin composition. By setting the content of the coupling agent to be equal to or less than the upper limit value, it is possible to promote improvement of the mechanical strength in a cured product of the epoxy resin composition.

[Other Components]

Various additives, such as an ion scavenger such as hydrotalcite; a coloring agent such as carbon black and red iron oxide; a release agent, such as a natural wax such as carnauba wax, a synthetic wax such as montanic ester wax, a higher fatty acid such as zinc stearate and a metal salt thereof, and paraffin; and an antioxidant may be blended into the epoxy resin composition of the present embodiment, as appropriate.

Moreover, the epoxy resin composition of the present embodiment can include, for example, a low-stress agent. As the low-stress agent, one or two or more selected from silicone oil, silicone rubber, polyisoprene, polybutadienes such as 1,2-polybutadiene and 1,4-polybutadiene, styrene-butadiene rubber, acrylonitrile-butadiene rubber, thermoplastic elastomers such as polychloroprene, poly(oxypropylene), poly(oxytetramethylene) glycol, polyolefin glycol, and poly-ε-caprolactone, polysulfide rubber, and fluorine rubber can be included. Among those, the epoxy resin composition including at least one of silicone rubber, silicone oil, and acrylonitrile-butadiene rubber can be selected in a particularly preferred aspect from the viewpoint of controlling the modulus of elasticity to a desired range, and improving the temperature resistance cyclability and the reflow resistance of the obtained semiconductor packages and other structures.

In a case where the low-stress agent is used, the total content of the low-stress agent is preferably equal to or more than 0.05% by mass, and more preferably equal to or more than 0.10% by mass, with respect to the total solid content of the epoxy resin composition. On the other hand, the content of the low-stress agent is preferably equal to or less than 2% by mass, and more preferably equal to or less than 1% by mass, with respect to the total solid content of the epoxy resin composition. By controlling the content of the low-stress agent to be in such a range, it is possible to more reliably improve the temperature resistance cyclability and the reflow resistance of the obtained semiconductor packages and other structures.

A method for producing the epoxy resin composition of the present embodiment will be described. For example, the above-mentioned respective raw material components are mixed with a known unit to obtain a mixture. Further, the mixture is melt-kneaded to obtain a kneaded product. In the kneading method, for example, an extrusion kneader such as a uniaxial kneading extruder and a biaxial kneading extruder, or a roll kneader such as a mixing roll can be used, but the biaxial kneading extruder is preferably used. After cooling, the kneaded product can be made into a powdery, granular, tablet-like, or sheet-like shape.

Examples of a method for obtaining the powdery resin composition include a method in which a kneaded product is pulverized by a pulverizing device. A sheet formed by molding the kneaded product may also be pulverized. As the pulverizing device, for example, a hammer mill, a stone mill type grinder, a roll crusher, or the like can be used.

As a method for obtaining the granular or powdery resin composition, a granulation method typified by a hot-cut method in which a die having a small diameter is disposed at an outlet of a kneading device, and a kneaded product in the molten state, ejected from the die, is cut to a predetermined length with a cutter or the like. In this case, it is preferable that a granular or powdery resin composition is obtained by a granulation method such as a hot-cut method, and then degassing is performed during a period that the temperature of the resin composition is not extremely lowered.

The characteristics of the epoxy resin composition of the present embodiment will be described.

In the epoxy resin composition of the present embodiment, the upper limit value of the maximum exothermic peak temperature in a DSC curve of the epoxy resin composition is, for example, equal to or lower than 145° C., preferably equal to or lower than 140° C., more preferably equal to or lower than 138° C., and still more preferably equal to or lower than 135° C. With this value, it is possible to improve the low-temperature curability of the epoxy resin composition. For example, it is possible to shorten the curing time in a case where the curing is performed at a low temperature equal to or lower than 120° C. On the other hand, the lower limit value of the maximum exothermic peak temperature is not particularly limited, but may be equal to or higher than 80° C., equal to or higher than 90° C., or equal to or higher than 100° C. With the value, it is possible to maintain a state where viscosity of the epoxy resin composition is low during curing at a low temperature. Thus, it is possible to improve the fillability of the epoxy resin composition.

In the present embodiment, the DSC curve is obtained by performing measurement using the epoxy resin composition under a condition of elevating a temperature from 30° C. to 200° C. under a condition of a temperature elevating rate of 10° C./min using a differential scanning calorimeter.

In the present embodiment, the upper limit value of the exothermic onset temperature in the DSC curve is, for example, equal to or lower than 110° C., preferably equal to or lower than 105° C., more preferably equal to or lower than 95° C., and still more preferably equal to or lower than 92° C. With this value, it is possible to improve the low-temperature curability. On the other hand, the lower limit value of the exothermic onset temperature in the DSC curve is, for example, equal to or higher than 70° C., preferably equal to or higher than 75° C., and more preferably equal to or higher than 80° C. With this value, it is possible to suppress an increase in the viscosity during kneading, and maintain a state where viscosity of the epoxy resin composition is low during curing at a low temperature.

In the present embodiment, the exothermic onset temperature refers to a temperature at which a heat release amount height based on a heat release amount height H1 reaches 10% of ΔH1 in a case where a difference between a heat release amount height H1 at 70° C. and a heat release amount height $H_{MAX}$ at the maximum exothermic peak temperature is defined as ΔH1.

Furthermore, the DSC curve of the present embodiment has one exothermic peak exceeding 30% of ΔH1. With this, it is possible to realize an epoxy resin composition having excellent production stability.

Moreover, in the present embodiment, the peak height at the maximum exothermic peak temperature is represented by a heat release amount difference between a heat release amount at 70° C. and a heat release amount at the maximum exothermic peak temperature.

The lower limit value of the heat release amount difference is, for example, equal to or more than 120 microW/mg, preferably equal to or more than 140 microW/mg, and more preferably equal to or more than 160 microW/mg. With this value, it is possible to improve the curability of the epoxy resin composition. On the other hand, the upper limit value of the heat release amount difference is not particularly limited, but may be, for example, equal to or less than 400 microW/mg.

In the present embodiment, it is possible to control the maximum exothermic peak temperature or the exothermic onset temperature in the DSC curve, for example, by appropriately selecting the kinds or blending amounts of the respective components included in the epoxy resin composition, a method for preparing the epoxy resin composition, or the like. Among those, for example, a use of an imidazole-based curing accelerator incorporated into a three-dimensional crosslinking structure of a thermosetting resin as a curing accelerator; appropriate selection of an imidazole-based curing accelerator having little steric hindrance of a functional group to enhance the reactivity at a low temperature among the imidazole-based curing accelerators; enhancement of the dispersibility or content of a curing accelerator; a decrease in a kneading temperature not to allow a curing reaction to extremely proceed in the step of producing an epoxy resin composition; or the like can be mentioned as an element for the purpose of setting the maximum exothermic peak temperature or the exothermic onset temperature in the DSC curve to a desired numerical value range.

Furthermore, the lower limit value of the glass transition temperature of a cured product obtained by subjecting the epoxy resin composition of the present embodiment to compression-molding at 140° C. for 3 minutes, followed by post-curing at 140° C. for 4 hours is, for example, preferably equal to or higher than 140° C., more preferably equal to or higher than 150° C., and still more preferably equal to or higher than 160° C. With this value, it is possible to improve the heat resistance of a cured product of the epoxy resin composition. On the other hand, the upper limit value of the glass transition temperature of the cured product is not particularly limited, but may be, for example, equal to or lower than 250° C., or equal to or lower than 230° C.

In the epoxy resin composition of the present embodiment, the upper limit value of a time taken from the initiation of measurement of a torque value with a curelastometer at 120° C. to the arrival of the torque value to 2 N·m is, for example, equal to or less than 300 seconds, preferably equal to or less than 280 seconds, and more preferably equal to or less than 200 seconds. With this value, it is possible to realize an epoxy resin composition having excellent low-temperature curing characteristics. On the other hand, the lower limit value of the time is not particularly limited, but may be, for example, equal to or more than 30 seconds, equal to or more than 50 seconds, or equal to or more than 100 seconds. Thus, it is possible to improve the fluidity during molding.

In the epoxy resin composition of the present embodiment, the upper limit value of the minimum melt viscosity of a high performance flow tester as measured at 120° C. and a load of 40 kgf is, for example, equal to or less than 100 Pa·s, preferably equal to or less than 90 Pa·s, and more preferably equal to or less than 80 Pa·s. With this value, it is possible to improve the fluidity during molding. On the other hand, the lower limit value of the minimummelt viscosity of the high performance flow tester is not particularly limited, but may be, for example, equal to or more than 20 Pa·s.

The epoxy resin composition of the present embodiment can be used in various applications. For example, the epoxy resin composition of the present embodiment can be used in a resin composition for sealing or a resin composition for fixing. The sealing resin composition according to the present embodiment can seal electronic components such as a semiconductor chip, or can be applied to a resin composition for sealing a semiconductor used in the semiconductor package, a resin composition for sealing an electronic control unit in which a substrate equipped with electronic components is sealed, or a resin composition for a sensor, for a sensor module, for a camera, for a camera module, for a module with a display, for sealing a module with a battery-coin cell, or the like. Further, the applications are not limited to general electron devices, and the epoxy resin composition can be appropriately used in applications that require low-temperature sealing due to low heat resistance of components. In addition, the resin composition for fixing according to the present embodiment can also be used in fixing motor components, for example, in a resin composition for fixing a rotor core magnet or for fixing a stator.

The structure of the present embodiment includes a cured product of the epoxy resin composition. Examples of the structure include a semiconductor package, an electronic control unit in which a substrate equipped with electronic components and the like is sealed, a sensor, a sensor module, a camera, a camera module, a module with a display, a module with a battery coin cell, a motor, or the like.

Figure 1:
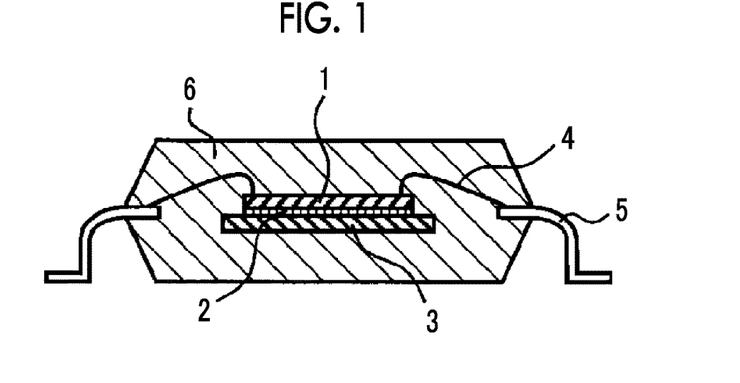
FIG. 1 is a cross-sectional view illustrating an example of a semiconductor device.

FIG. 1 is a view showing a cross-sectional structure in one example of a semiconductor device using the epoxy resin composition of the present embodiment. A semiconductor element 1 is fixed on die pad 3 through a die bonding material cured body 2. An electrode pad of the semiconductor element 1 and a lead frame 5 are connected by a bonding wire 4. The semiconductor element 1 is sealed with the cured body 6 of the epoxy resin composition of the present embodiment.

Figure 2:
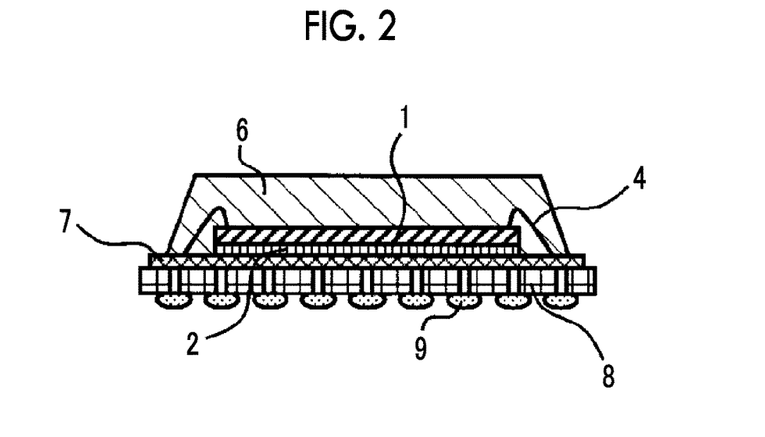
FIG. 2 is a cross-sectional view illustrating an example of a semiconductor device.

FIG. 2 is a view showing a cross-sectional structure in one example of a one-sided sealed semiconductor device using the epoxy resin composition of the present embodiment. A semiconductor element 1 is fixed on a solder resist 7 of a laminate having a layer having the solder resist 7 formed on the surface of a substrate 8 through a die bonding material cured body 2. In order to establish a conduction between the semiconductor element 1 and the substrate 8, the solder resist 7 on the electrode pad is removed by a development method so as to expose the electrode pad of the substrate 8. The electrode pad of the semiconductor element 1 and the electrode pad of the substrate 8 are connected through a bonding wire 4. Only one side of the substrate 8 on which the semiconductor element 1 is mounted is sealed with the cured body 6 of the epoxy resin composition of the present embodiment. The electrode pad on the substrate 8 is internally joined to a solder ball 9 on the side of the unsealed surface on the substrate 8.

Figure 3:
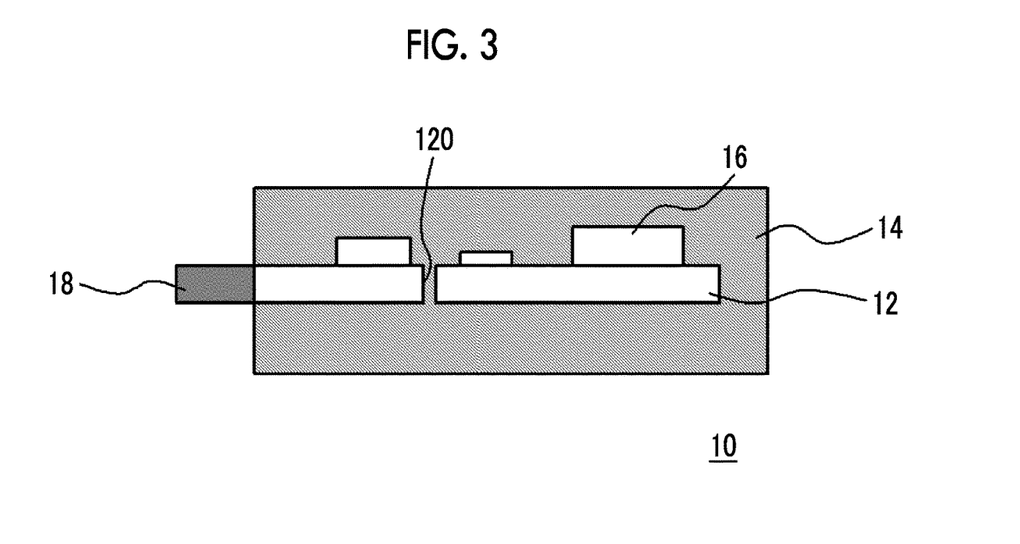
FIG. 3 is a cross-sectional view illustrating an example of a structure.

FIG. 3 is a cross-sectional schematic view showing one example of a structure (on-vehicle electronic control unit 10) of the present embodiment.

The on-vehicle electronic control unit 10 is used to control an engine, various types of on-vehicle equipment, or the like. As shown in FIG. 3, the on-vehicle electronic control unit 10 includes, for example, a substrate 12, an electronic component 16 mounted on the substrate 12, and a sealing resin layer 14 that seals the substrate 12 and the electronic component 16. The substrate 12 has a connection terminal 18 for connection to the outside on at least one side. The on-vehicle electronic control unit 10 according to one example of the present embodiment is electrically connected to the opposite connector through the connection terminal 18 by fitting the connection terminal 18 to the opposite connector.

The substrate 12 is, for example, a wiring board in which a circuit wiring is provided on one or both of one surface and the other surface opposite to the one surface. As shown in FIG. 3, the substrate 12 has, for example, a flat plate shape. In the present embodiment, an organic substrate formed from an organic material such as a polyimide can be adopted as the substrate 12. Further, the thickness of the substrate 12 is not particularly limited, but may be, for example, equal to or more than 0.1 mm and equal to or less than 5 mm, and preferably equal to or more than 0.5 mm and equal to or less than 3 mm.

In the present embodiment, the substrate 12 may be provided with, for example, a through-hole 120 which penetrates the substrate 12 and connects one surface to the other surface. In this case, a wiring provided on one surface of the substrate 12 and a wiring provided on the other surface are electrically connected to each other through a conductor pattern provided in the through-hole 120. The conductive pattern is formed along the wall surface of the through-hole 120. That is, the conductive pattern in the through-hole 120 is formed in a tubular shape. In the through-hole 120 after the sealing step, a cured product (sealing resin layer 14) of the epoxy resin composition of the present embodiment is filled in a gap hole composed on the inner wall surface of the conductive pattern.

For example, an electronic component 16 is mounted on one or both of one surface and the other surface of the substrate 12. The electronic component 16 is not particularly limited to the electronic component as long as it can be mounted on an on-vehicle electronic control unit, but examples thereof include a microcomputer.

In the on-vehicle electronic control unit 10 according to the present embodiment, for example, the substrate 12 may be mounted on a metal base. The metal base can function as a heat sink that radiates heat generated from the electronic component 16, for example. In the present embodiment, the on-vehicle electronic control unit 10 can be formed, for example, by integrally sealing and molding the metal base and the substrate 12 mounted on the metal base with the epoxy resin composition. A metal material constituting the metal base is not particularly limited, but examples thereof include iron, copper, and aluminum, and alloys including one or two or more of the metals. Further, the on-vehicle electronic control unit 10 may not include a metal base.

The present invention has been described above with reference to embodiments, but the present invention is not limited to the embodiments and the configurations thereof can also be modified while the gist of the present invention is not modified.

EXAMPLES

Hereinafter, the present invention will be described in detail with reference to Examples, but is not limited to the description of these Examples.

The components used in the respective Examples and the respective Comparative Examples are shown below.

(Preparation of Epoxy Resin Composition)

First, the respective raw materials that had been blended according to Table 1 were mixed using a mixer at normal temperature and then roll-kneaded at 70° C. to 90° C. Subsequently, the obtained kneaded product was cooled and then pulverized to obtain an epoxy resin composition. The details of the respective components in Table 1 are as follows. Further, the unit in Table 1 is % by mass.

(Epoxy Resin)

Epoxy resin 1: Orthocresol novolak type epoxy resin (manufactured by Nippon Kayaku Co., Ltd., EOCN-1020-55, epoxy equivalents of 196 g/eq, and a softening point of 55° C.)

Epoxy resin 2: Orthocresol novolak type epoxy resin (manufactured by Nippon Kayaku Co., Ltd., EOCN-1020-62, epoxy equivalents of 198 g/eq, and a softening point of 62° C.)

Epoxy resin 3: Biphenyl type epoxy resin (manufactured by Mitsubishi Chemical Corporation, YX-4000K, epoxy equivalents of 185 g/eq, and a melting point of 108° C.)

Epoxy resin 4: Triphenolmethane type epoxy resin (manufactured by Mitsubishi Chemical Corporation, 1032H60, epoxy equivalents of 171 g/eq, and a softening point of 59° C.)

Epoxy resin 5: Naphthalene type epoxy resin (manufactured by DIC Corporation, HP-4770, epoxy equivalents of 205 g/eq, and a softening point of 72° C.)

(Curing Agent)

Curing agent 1: Phenol novolak resin (manufactured by Sumitomo Bakelite Co., Ltd., PR-55617, hydroxyl group equivalents of 104, and a softening point of 74° C.)

Curing agent 2: Phenol resin having a trisphenylmethane skeleton represented by General Formula (4) (manufactured by Air Water Inc., HE910-20, hydroxyl group equivalents of 101, and a softening point of 88° C.)

(4)

Curing agent 3: Phenolaralkyl resin having a biphenylene skeleton (manufactured by Meiwa Plastic Industries, Ltd., MEHC-7800-4S, hydroxyl group equivalents of 168, and a softening point of 62° C.)

(Inorganic Filler)

Inorganic filler 1: Fused spherical silica (manufactured by Denka Co., Ltd., FB-950, and an average particle diameter of 23 μm)

Inorganic filler 2: Fused spherical silica (manufactured by Denka Co., Ltd., FB-105, and an average particle diameter of 11 μm)

Inorganic filler 3: Fused spherical silica (manufactured by Admatechs Co., Ltd., SO-25R, and an average particle diameter of 0.5 μm)

(Curing Accelerator)

Curing accelerator 1: 2-Phenylimidazole (manufactured by Shikoku Chemicals Corporation)

Curing accelerator 2: 2-Methylimidazole (manufactured by Shikoku Chemicals Corporation)

Curing accelerator 3: 2-Phenyl-4-methylimidazole (manufactured by Shikoku Chemicals Corporation)

Curing accelerator 4: 2-Phenyl-4-methyl-5-hydroxymethylimidazole (manufactured by Shikoku Chemicals Corporation)

Curing accelerator 5: Triphenylphosphine (PP-360, manufactured by K·I Chemical Industry Co., Ltd.)

Curing accelerator 6: Curing accelerator 6 represented by the following formula

[Method for Synthesizing Curing Accelerator 6]

249.5 g of phenyl trimethoxysilane and 384.0 g of 2,3-dihydroxynaphthalene were added to a flask in which 1,800 g of methanol had been placed, and dissolved, and then 231.5 g of a 28% sodium methoxide-methanol solution was added dropwise to the mixture under stirring at room temperature. Further, a solution obtained by dissolving 503.0 g of tetraphenylphosphonium bromide prepared in advance in 600 g of methanol was added dropwise to the mixture under stirring at room temperature to precipitate crystals. The precipitated crystals were filtered, washed with water, and vacuum-dried to obtain the curing accelerator 6 of peach and white crystals.

Curing accelerator 7: Curing accelerator 7 represented by the following formula

[Method for Synthesizing Curing Accelerator 7]

37.5 g (0.15 mol) of 4,4'-bisphenol S and 100 ml of methanol were introduced into a separable flask with a stirring device, and stirred and dissolved at room temperature, and a solution obtained by dissolving 4.0 g (0.1 mol) of sodium hydroxide in 50 ml of methanol in advance was further added to the mixture under stirring. Subsequently, a solution obtained by dissolving 41.9 g (0.1 mol) of tetraphenylphosphonium bromide in 150 ml of methanol in advance was added to the mixture. Stirring was continued for a while, 300 ml of methanol was added to the mixture, and then the solution in the flask was added dropwise to a large amount of water under stirring to obtain a white precipitate. The precipitate was filtered and dried to obtain the curing accelerator 7 of white crystals.

Curing accelerator 8: Curing accelerator 8 represented by the following formula

[Method for Synthesizing Curing Accelerator 8]

12.81 g (0.080 mol) of 2,3-dihydroxynaphthalene, 16.77 g (0.040 mol) of tetraphenylphosphonium bromide, and 100 ml of methanol were introduced into a separable flask with a condenser and a stirring device, stirred, and uniformly dissolved. A sodium hydroxide solution obtained by dissolving 1.60 g (0.04 ml) of sodium hydroxide in 10 ml of methanol in advance was slowly added dropwise to the mixture in the flask to precipitate crystals. The precipitated crystals were filtered, washed with water, and vacuum-dried to obtain the curing accelerator 8 represented by the formula.

Curing accelerator 9: Curing accelerator 9 represented by the following formula (Compound having 1,4-benzoquinone and triphenylphosphine added thereto)

[Method for Synthesizing Curing Accelerator 9]

6.49 g (0.060 mol) of benzoquinone, 17.3 g (0.066 mol) of triphenylphosphine, and 40 ml of acetone were introduced into a separable flask with a condenser and a stirring device and allowed to undergo a reaction under stirring at room temperature. The precipitated crystals were washed with acetone, then filtered, and dried to obtain a compound having 1,4-benzoquinone and triphenylphosphine added thereto (curing accelerator 9) of dark green crystals.

(Coupling Agent)

Coupling agent 1: N-phenyl γ-aminopropyl trimethoxysilane (manufactured by Shin-Etsu Chemical Co., Ltd., KBM-573)

(Additive)

Release agent 1: Carnauba wax (C-WAX manufactured by Toakasei Co., Ltd.)

Coloring agent 1: Carbon black (manufactured by Mitsubishi Chemical Corporation, #5)

TABLE 1

| | | Unit | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 | Comparative Example 4 |
|---|---|---|---|---|---|---|---|---|---|---|---|---|---|---|---|---|
| Epoxy resin composition | Epoxy resin | % by mass | | | | | | | | | | | | | | |
| | Epoxy resin 1 | | 13.71 | 13.98 | | 14.12 | 13.22 | 10.23 | 13.85 | | | | 14.34 | 14.21 | 14.24 | 14.24 |
| | Epoxy resin 2 | | | | 14.03 | | | | | | | | | | | |
| | Epoxy resin 3 | | | | | | | 3.41 | | | | | | | | |
| | Epoxy resin 4 | | | | | | | | | 12.97 | | | | | | |
| | Epoxy resin 5 | | | | | | | | | | 13.88 | 12.92 | | | | |
| Curing agent | Curing agent 1 | | 7.27 | 7.42 | 7.37 | | | 7.34 | 7.35 | 7.89 | 7.04 | 4.85 | 7.61 | 7.54 | 7.56 | 7.56 |
| | Curing agent 2 | | | | | 7.28 | | | | | | | | | | |
| | Curing agent 3 | | | | | | 1.94 | | | | | 3.23 | | | | |
| Inorganic filler | Inorganic Filler 1 | | 50.00 | 50.00 | 50.00 | 50.00 | 50.00 | 50.00 | 50.00 | 50.00 | 50.00 | 60.00 | 50.00 | 50.00 | 50.00 | 50.00 |
| | Inorganic Filler 2 | | 17.00 | 17.00 | 17.00 | 17.00 | 17.00 | 17.00 | 17.00 | 17.00 | 17.00 | 17.00 | 17.00 | 17.00 | 17.00 | 17.00 |
| | Inorganic Filler 3 | | 10.00 | 10.00 | 10.00 | 10.00 | 10.00 | 10.00 | 10.00 | 10.00 | 10.00 | | 10.00 | 10.00 | 10.00 | 10.00 |
| Coupling agent | Coupling agent 1 | | 0.20 | 0.20 | 0.20 | 0.20 | 0.20 | 0.20 | 0.20 | 0.20 | 0.20 | 0.20 | 0.20 | 0.20 | 0.20 | 0.20 |
| Curing accelerator | Curing accelerator 1 | | 1.00 | 0.80 | 0.80 | 0.80 | 1.00 | 1.00 | | 1.00 | 1.00 | 0.25 | | | | |
| | Curing accelerator 2 | | 0.22 | | | | 0.22 | 0.22 | | 0.34 | 0.28 | | | | | |
| | Curing accelerator 3 | | | | | | | | 1.00 | | | | | | | |
| | Curing accelerator 4 | | | | | | | | | | | | 0.25 | | | |
| | Curing accelerator 5 | | | | | | | | | | | | | 0.40 | | |
| | Curing accelerator 6 | | | | | | | | | | | | | 0.05 | | |
| | Curing accelerator 7 | | | | | | | | | | | 0.95 | | | | |
| | Curing accelerator 8 | | | | | | | | | | | | | | 0.40 | |
| | Curing accelerator 9 | | | | | | | | | | | | | | | 0.40 |
| Additive | Release agent 1 | | 0.30 | 0.30 | 0.30 | 0.30 | 0.30 | 0.30 | 0.30 | 0.30 | 0.30 | 0.30 | 0.30 | 0.30 | 0.30 | 0.30 |
| | Coloring agent 1 | | 0.30 | 0.30 | 0.30 | 0.30 | 0.30 | 0.30 | 0.30 | 0.30 | 0.30 | 0.30 | 0.30 | 0.30 | 0.30 | 0.30 |
| Total | | | | 100.0 | 100.0 | 100.0 | 100.0 | 100.0 | 100.0 | 100.0 | 100.0 | 100.0 | 100.0 | 100.0 | 100.0 | 100.0 |
| High performance flow viscosity (120° C., and load of 40 kgf) | | Pa·s | 80 | 69 | 79 | 81 | 76 | 62 | 63 | 93 | 63 | 70 | 62 | 60 | 61 | 60 |
| Time for arrival of curelast torque value to 2 N·m (120° C.) | | s | 120 | 195 | 185 | 176 | 132 | 190 | 280 | 69 | 82 | 226 | >300 | >300 | >300 | >300 |
| DSC | Number of exothermic peaks | Peaks | 1 | 1 | 1 | 1 | 1 | 1 | 1 | 1 | 1 | 1 | 1 | 1 | 1 | 1 |
| | Maximum exothermic peak temperature | °C. | 126 | 135 | 133 | 131 | 130 | 135 | 140 | 120 | 120 | 140 | 152 | 166 | 166 | 166 |
| | Exothermic onset temperature | °C. | 88 | 92 | 92 | 90 | 89 | 92 | 96 | 79 | 79 | 105 | 108 | 136 | 134 | 132 |
| | Difference in heat release | MicroW/mg | 163 | 188 | 186 | 182 | 170 | 185 | 197 | 184 | 154 | 215 | 210 | 297 | 280 | 274 |
| | Heat release amount at 70° C. and heat release amount at maximum exothermic peak temperature | | 170 | 166 | 170 | 176 | 152 | 144 | 166 | 185 | 180 | 170 | 162 | 157 | 157 | 157 |
| Glass transition temperature | | °C. | | | | | | | | | | | | | | |

For the obtained epoxy resin composition, the following evaluations were performed. The results of the evaluations are shown in Table 1.

(High Performance Flow Viscosity)

An apparent viscosity η of the obtained epoxy resin composition was measured under a test condition of a temperature 120° C., a load of 40 kgf (a piston area of 1 cm$^2$), a die pore diameter of 0.50 mm, and a die length of 1.00 mm, using a high performance flow tester (manufactured by Shimadzu Corporation, CFT-500D). The viscosity n was calculated by the following equation. In the equation, Q is a flow amount of the epoxy resin composition flowing per unit time. The unit in Table 1 is Pa·s.

$$\eta=(\pi D^4 P/128LQ)\times 10^{-3}(Pa\cdot s)$$

η: Apparent viscosity
D: Die pore diameter (mm)
P: Test pressure (Pa)
L: Die length (mm)
Q: Flow rate (cm$^3$/s)

(Curelast)

The torque value of the obtained epoxy resin composition was measured over time at a mold temperature of 120° C. and an amplitude angle of ±0.25 degrees, using a curelastometer (manufactured by A & D Co., Ltd., Curelastometer MODEL 7). Based on the measurement results, a time (s) taken from the initiation of the measurement to the arrival of the torque value to 2 N·m was calculated.

(DSC)

Using 10 mg of the epoxy resin composition, measurement was performed under a temperature range condition ranging from 30° C. to 200° C. at a temperature elevating rate of 10° C./min in a nitrogen air stream, using a differential scanning calorimeter (manufactured by Seiko Instruments Inc., DSC7020). A temperature at which a heat release amount height based on a heat release amount height H1 reached 10% of ΔH1 in a case where a difference between the heat release amount height H1 at 70° C. and a heat release amount height $H_{MAX}$ at the maximum exothermic peak temperature was defined as ΔH1 was taken as an exothermic onset temperature. The exothermic peak was set to exceed 30% of ΔH1.

(Glass Transition Temperature)

The glass transition temperature of a cured product of the obtained epoxy resin composition was measured as follows. First, the epoxy resin composition was injection-molded at a mold temperature of 140° C. (each of Examples) and 175° C. (each of Comparative Examples), an injection pressure of 9.8 MPa, and a curing time of 3 minutes, using a transfer molding machine, thereby obtaining a test piece in 15 mm×4 mm×4 mm. Subsequently, the obtained test piece was post-cured at 140° C. (each of Examples) and 175° C. (each of Comparative Examples) for 4 hours, and then measured under a condition of a measurement temperature range of 0° C. to 320° C. and a temperature elevating rate of 5° C./min, using a thermomechanical analysis apparatus (manufactured by Seiko Instruments Inc., TMA/SS6100). A glass transition temperature was calculated from the measurement results. The results are shown in Table 1.

It was demonstrated that the epoxy resin compositions of Examples 1 to 10 have excellent low-temperature curability since the curelast torque value increasing rate was high in a low-temperature region, as compared with the epoxy resin compositions of Comparative Examples 1 to 4. Further, it was demonstrated that the epoxy resin compositions of Examples 1 to 10 can maintain a state where viscosity of the epoxy resin composition is low since the exothermic onset temperature exists at a relatively high temperature, and can improve the fillability during molding. In addition, it was demonstrated that the epoxy resin compositions of Examples 1 to 10 can improve the temperature resistance cyclability in a view that the epoxy resin compositions have a relatively high glass transition temperature.

The application claims the benefit of priority based on Japanese Patent Application No. 2016-214890 filed on Nov. 2, 2016, the entire disclosure of which is incorporated herein by reference.

The invention claimed is:

1. An epoxy resin composition comprising:
   an epoxy resin;
   a curing agent;
   an inorganic filler; and
   a curing accelerator,
   wherein the curing accelerator includes an imidazole-based curing accelerator,
   wherein a content of the epoxy resin is equal to or more than 8% by mass and equal to or less than 20% by mass with respect to the total solid content of the epoxy resin composition,
   wherein a content of the imidazole-based curing accelerator is equal to or more than 4.0% by mass and equal to or less than 12.0% by mass with respect to the total solid content of the epoxy resin composition, and
   wherein a maximum exothermic peak temperature in a DSC curve of the epoxy resin composition obtained in a case of elevating a temperature from 30° C. to 200° C. under a condition of a temperature elevating rate of 10° C./min using a differential scanning calorimeter is equal to or higher than 80° C. and equal to or lower than 145° C.

2. The epoxy resin composition according to claim 1, wherein a glass transition temperature of a cured product of the epoxy resin composition is equal to or higher than 140° C. and equal to or lower than 250° C.

3. The epoxy resin composition according to claim 1, wherein an exothermic onset temperature in the DSC curve is in a range equal to or higher than 70° C. and equal to or lower than 110° C.

4. The epoxy resin composition according to claim 1, wherein the DSC curve has one exothermic peak exceeding 30% of ΔH1 which represents a difference between a heat release amount height H1 at 70° C. and a heat release amount height $H_{MAX}$ at the maximum exothermic peak temperature.

5. The epoxy resin composition according to claim 1, wherein a time taken from the initiation of measurement of a torque value with a curelastometer at 120° C. to the arrival of the torque value to 2 N·m is equal to or more than 30 seconds and equal to or less than 300 seconds.

6. The epoxy resin composition according to claim 1, wherein a minimum melt viscosity of a high performance flow tester as measured at 120° C. and a load of 40 kgf is equal to or more than 20 Pa·s and equal to or less than 100 Pa·s.

7. The epoxy resin composition according to claim 1, wherein a heat release amount difference between a heat release amount at 70° C. and a heat release amount at the maximum exothermic peak temperature is equal to or more than 120 microW/mg and equal to or less than 400 microW/mg.

8. The epoxy resin composition according to claim 1, wherein the imidazole-based curing accelerator includes one or more selected from the group consisting of 2-phenylimidazole, 2-methylimidazole, 2-phenyl-4-methylimidazole, and 2-phenyl-4-methyl-5-hydroxymethylimidazole.

9. The epoxy resin composition according to claim 1, wherein the number of functional groups of the imidazole-based curing accelerator is equal to or less than 3.

10. The epoxy resin composition according to claim 1, wherein the curing accelerator includes another kind of the imidazole-based curing accelerator.

11. The epoxy resin composition according to claim 1, wherein the curing agent includes a phenol resin-based curing agent.

12. The epoxy resin composition according to claim 1, wherein the inorganic filler includes a filler having an average particle diameter D50 equal to or more than 1 µm and equal to or less than 50 µm.

13. The epoxy resin composition according to claim 1, wherein the inorganic filler includes a filler having another average particle diameter D50.

14. The epoxy resin composition according to claim 1, wherein the inorganic filler includes fused silica.

15. The epoxy resin composition according to claim 1, wherein the epoxy resin composition has a powdery, granular, tablet-like, or sheet-like shape.

16. The epoxy resin composition according to claim 1, wherein the epoxy resin composition is used in a resin composition for sealing or a resin composition for fixing.

17. A structure comprising a cured product of the epoxy resin composition according to claim 1.

18. The epoxy resin composition according to claim 1, wherein a content of the inorganic filler is equal to or more than 70% by mass and equal to or less than 95% by mass with respect to the total solid content of the epoxy resin composition.

\* \* \* \* \*